US006870827B1

(12) United States Patent
Voit et al.

(10) Patent No.: US 6,870,827 B1
(45) Date of Patent: Mar. 22, 2005

(54) VOICE CALL ALTERNATIVE ROUTING THROUGH PSTN AND INTERNET NETWORKS

(75) Inventors: Eric A. Voit, Baltimore, MD (US); James E. Curry, Herndon, VA (US); Robert D. Farris, Sterling, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 08/821,027

(22) Filed: Mar. 19, 1997

(51) Int. Cl.[7] .............................................. H04L 12/66
(52) U.S. Cl. ...................................... 370/352; 370/356
(58) Field of Search ................................ 370/352–356

(56) References Cited

U.S. PATENT DOCUMENTS

| | | |
|---|---|---|
| 4,652,700 A | 3/1987 | Matthews et al. |
| 4,827,500 A | 5/1989 | Binkerd et al. |
| 4,866,763 A * | 9/1989 | Cooper et al. ......... 379/221.02 |
| 4,872,160 A | 10/1989 | Hemmady et al. |
| 4,958,341 A | 9/1990 | Hemmady et al. |
| 5,008,926 A | 4/1991 | Misholi |
| 5,012,511 A | 4/1991 | Hanle et al. |
| 5,029,199 A | 7/1991 | Jones et al. |
| 5,193,110 A | 3/1993 | Jones et al. |
| 5,206,901 A | 4/1993 | Harlow et al. |
| 5,208,848 A | 5/1993 | Pula |
| 5,247,571 A | 9/1993 | Kay et al. |
| 5,309,437 A | 5/1994 | Perlman et al. |
| 5,341,374 A | 8/1994 | Lewen et al. |
| 5,375,068 A | 12/1994 | Palmer et al. |
| 5,406,557 A | 4/1995 | Baudoin |
| 5,410,754 A | 4/1995 | Klotzbach et al. |
| 5,430,727 A | 7/1995 | Callon |
| 5,434,913 A | 7/1995 | Tung et al. |
| 5,490,247 A | 2/1996 | Tung et al. |
| 5,493,568 A | 2/1996 | Sampat et al. |
| 5,583,920 A * | 12/1996 | Wheeler, Jr. ............. 379/88.01 |
| 5,608,786 A | 3/1997 | Gordon |

(List continued on next page.)

OTHER PUBLICATIONS

Chopra, Manvinder, Exploring Intelligent Peripheral Configuration, Universal Personal Communications, 1994. Record., 1994 Third Annual International Conference on, Sep. 27–Oct. 1, 1994, Page(s): 635 –639.*

Weisser et al. "*The Intelligence Network and ForwardLooking Technology*" IEEE COMM magazine, Dec. 1988, pp. 64–69.

Shah et al. "*Application of a New Network Concept for Faster Service Deployment*" International Conference on COMM. 88 Jun. 12–15, 1988, IEEE Comm. Soc. Conference. Record, vol. 3, pp. 1327–1329.

*Primary Examiner*—Chi Pham
*Assistant Examiner*—Keith George
(74) *Attorney, Agent, or Firm*—Leonard C. Suchyta, Esq.; Joel Wall, Esq.; Rader, Fishman & Grauer

(57) ABSTRACT

The advanced intelligent network (AIN) to determine routing of voice calls alternatively between the public switched telephone network (PSTN) and a data packet network, such as the Internet, in accordance with the quality of service existing in the data packet network at the times of call origination. The user's acceptable level of service may be predefined with a threshold quality level stored in the user's Call Processing Record (CPR) in the AIN Integrated Services Control Point (ISCP). On a per call basis, the caller linked to a first public switched network may indicate a preference to route through the Internet. This indication is recognized by the AIN system, in response to which the quality of service currently present on the Internet for completion of the call is measured. If the result exceeds the stored threshold, the call is setup and routed through the Internet to the switched network link to the destination party. If the quality of service on the Internet is not satisfactory, the call is alternatively routed through the PSTN, which may include an Interexchange Carrier link. The AIN system automatically controls the alternative routing of such calls.

27 Claims, 7 Drawing Sheets

U.S. PATENT DOCUMENTS

| | | | | |
|---|---|---|---|---|
| 5,661,792 A | * | 8/1997 | Akinpelu et al. | 379/221.13 |
| 5,680,446 A | * | 10/1997 | Fleischer et al. | 379/114.28 |
| 5,712,903 A | * | 1/1998 | Bartholomew et al. | 379/88.25 |
| 5,724,355 A | | 3/1998 | Bruno et al. | |
| 5,726,984 A | | 3/1998 | Kubler et al. | |
| 5,889,774 A | * | 3/1999 | Mirashrafi et al. | 370/352 |
| 5,898,668 A | * | 4/1999 | Shaffer | 370/230 |
| 5,898,673 A | * | 4/1999 | Riggan et al. | 370/237 |
| 5,903,558 A | * | 5/1999 | Jones et al. | 370/351 |
| 6,026,087 A | * | 2/2000 | Mirashrafi et al. | 370/352 |
| 6,064,653 A | * | 5/2000 | Farris | 370/237 |

* cited by examiner

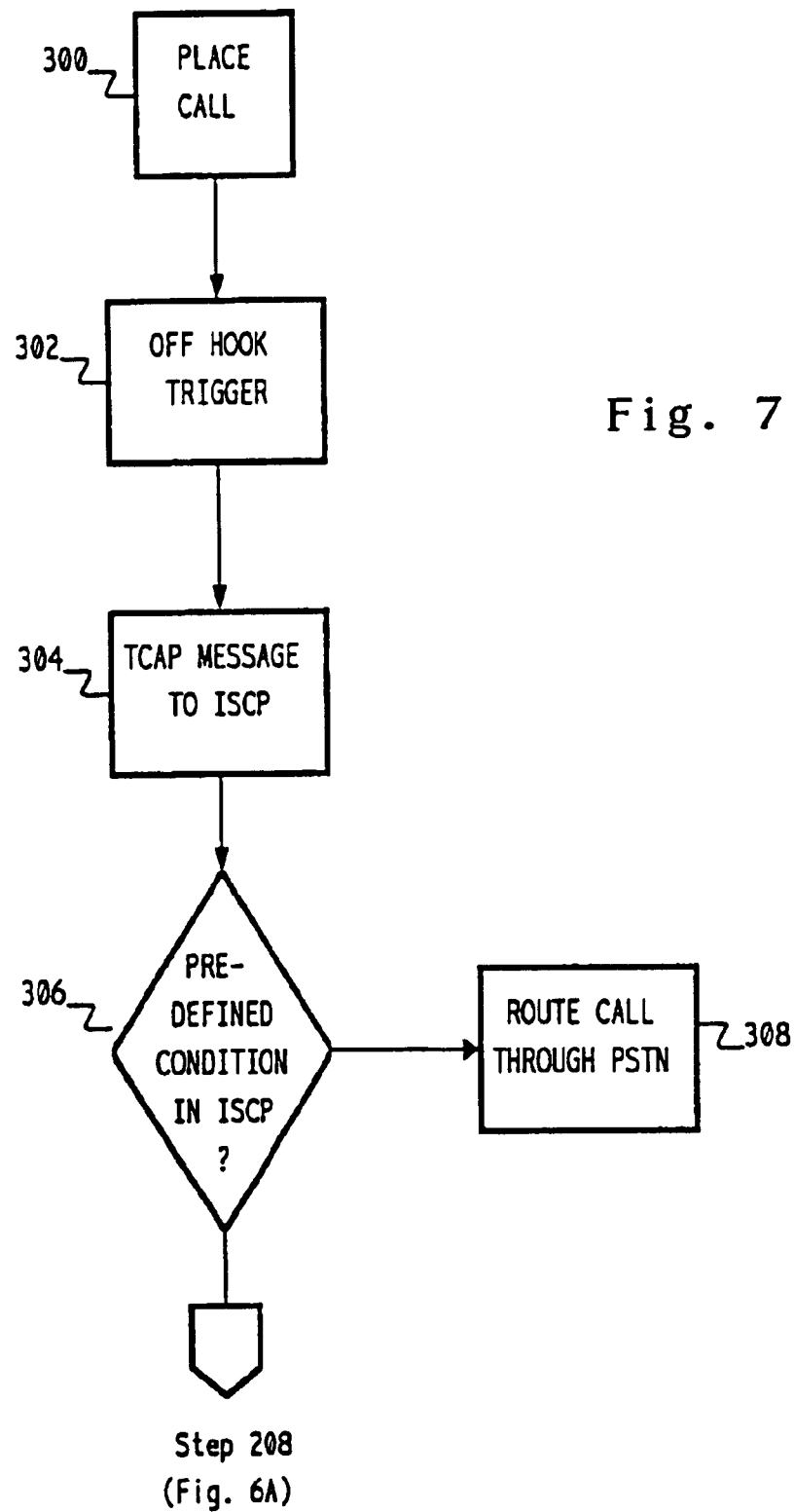

VOICE CALL ALTERNATIVE ROUTING THROUGH PSTN AND INTERNET NETWORKS

RELATED APPLICATIONS

This application is related to U.S. Pat. No. 5,790,548, entitled Universal Access Multimedia Network, issued Aug. 4, 1998, U.S. Pat. No. 6,438,218, entitled Internet Telephone Service, issued Aug. 20, 2002, U.S. Pat. No. 6,069,890, entitled Internet Telephone System, issued May 30, 2000, U.S. Pat. No. 6,064,653, entitled Internetwork Gateway To Gateway Alternative Communication, issued May 16, 2000, and application Ser. No. 08/815,361, now abandoned. The specification of the application and patents are incorporated herein by reference in their entirety.

TECHNICAL FIELD

The present invention relates to telecommunications networks and more particularly to transporting voice calls alternatively through an Internet path or the public switched telephone network (PSTN) in dependence upon Internet service quality.

BACKGROUND OF INVENTION

Implementation of voice telephone service over a worldwide data network, such as the Internet, offers advantages that are now being explored. The Internet had its genesis in U.S. Government (called ARPA) funded research which made possible national internetworked communication systems. This work resulted in the development of network standards as well as a set of conventions for interconnecting networks and routing information. These protocols are commonly referred to as TCP/IP. The protocols generally referred to as TCP/IP were originally developed for use only through Arpanet and have subsequently become widely used in the industry. TCP/IP is flexible and robust. In effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries.

A simplified diagram of the Internet is depicted in FIG. 1. Generally speaking the Internet 50 consists of Autonomous Systems (AS) which may be owned and operated by Internet Service Providers (ISPs) such as PSI, UUNET, MCI, SPRINT, etc. Three such AS/ISPs are shown in FIG. 1 at 52, 54 and 56. The Autonomous Systems (ASs) are linked by Inter-AS Connections 58, 60 and 62. Information Providers (IPs) 64 and 66, such as America Online (AOL) and Compuserve, are connected to the Internet via high speed lines 68 and 70, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, Sprint is an ISP, and MicroSoft (MSN) is an IP using UUNET as an ISP. Other information providers, such as universities, are indicated in exemplary fashion at 72 and are connected to the AS/ISPs via the same type connections, here illustrated as T1 lines 74. Corporate Local Area Networks (LANs), such as those illustrated in 76 and 78, are connected through routers 80 and 82 and links shown as T1 lines 84 and 86. Laptop or PC computers 88 and 90 are representative of computers connected to the Internet via the public switched telephone network (PSTN), shown connected to the AS/ISPs via dial up links 92 and 96.

The Information Providers (IPs) are end systems that collect and market the information through their own servers. Access providers are companies such as UUNET, PSI, MCI and SPRINT which transport the information. Such companies market the usage of their networks.

In simplified fashion the Internet may be viewed as a series of gateway routers connected together with computers connected to the routers. In the addressing scheme of the Internet an address comprises four numbers separated by dots. An example would be 164.109.211.237. Each machine on the Internet has a unique number that includes one of these four numbers. In the address, the leftmost number is the highest number. By analogy this would correspond to the ZIP code in a mailing address. The first two numbers that constitute this portion of the address may indicate a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This process continues until the packet arrives at the destination computer. The separate packets that constitute a message may not travel the same path, depending on traffic load. However, they all reach the same destination and are assembled in their original order in a connectionless fashion. This is in contrast to connection oriented modes such as frame relay and ATM or voice.

Software has recently been developed for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers. The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. No. 5,434,913, issued Jul. 18, 1995, and 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

The commonly assigned U.S. Pat. No. 6,438,218 and U.S. Pat. No. 6,069,890, identified more particularly above, are concerned with providing telephone service via the Internet to users of the public telecommunications network who may not have access to a computer or separate telephone access to the Internet. Such service would be economical, especially for long distance calls, compared with the toll rates charged by long distance interexchange carriers.

With increasing volume of use on the Internet and the bursty nature of data transmission, traffic patterns have become unstable and unpredictable. The minimum quality of service acceptable for voice communication is much higher than the level for data transport as transmission delays noticeably degrade conversation. With the Internet or other high volume data network, acceptable voice communication may be available between two end points at a given time, but often not at other times. A surge in data traffic may make the network unsuitable for voice communication for as much as twenty or thirty minutes. Bottlenecks may occur at different points in the network at different times. The locations of the participants of a voice call are factors in determining suitability of the data network. The degree to which degradation of a voice call remains acceptable is subjective with the user and can be a tradeoff between quality of service and reduction of cost.

A deficiency in earlier proposed voice Internet service systems is the inability to ensure an acceptable level of service quality. The data packet network traffic in the connection paths of a voice call may render intolerable transmission delays. Current systems do not measure delays against user acceptable standards. The voice call user must either endure such a call or terminate the call in favor of originating a new call through an alternative system.

BRIEF SUMMARY OF THE INVENTION

The present invention overcomes the above noted drawbacks of earlier proposed systems and provides additional advantages in part by utilizing the advanced intelligent network (AIN) to determine routing of voice calls alternatively between the public switched telephone network (PSTN) and a data packet network, such as the Internet, in accordance with the quality of service existing in the data packet network at the times of call origination. The user's acceptable level of service may be predefined with a threshold quality level stored in the user's Call Processing Record (CPR) in the AIN Integrated Services Control Point (ISCP). On a per call basis, the caller linked to a first public switched network may indicate a preference to route through the Internet. This indication is recognized by the AIN system, in response to which the quality of service currently present on the Internet for completion of the call is measured. If the result exceeds the stored threshold, the call is setup and routed through the Internet to the switched network link to the destination party. If the quality of service on the Internet is not satisfactory, the call is alternatively routed through the PSTN, which may include an Interexchange Carrier link. The AIN system automatically controls the alternative routing of such calls. The Interexchange Carrier selection may be made in accordance with a carrier identified in the calling subscriber's CPR or the ISCP may determine routing through a default carrier in accordance with a global routing scheme.

The invention thus provides the advantages of enabling a caller to indicate, individually for each call, a preference for that call to be routed through a packet data network if the performance of that network is currently acceptable. If not, routing of the call is made through the PSTN in normal fashion. The route actually undertaken in this process is transparent and undetectable to the caller at the time of the call.

Additional advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 7 is a partial simplified flow diagram for the preferred embodiment of the invention in which service is provided on a predefined basis.

DETAILED DESCRIPTION OF THE INVENTION

Figure 2:
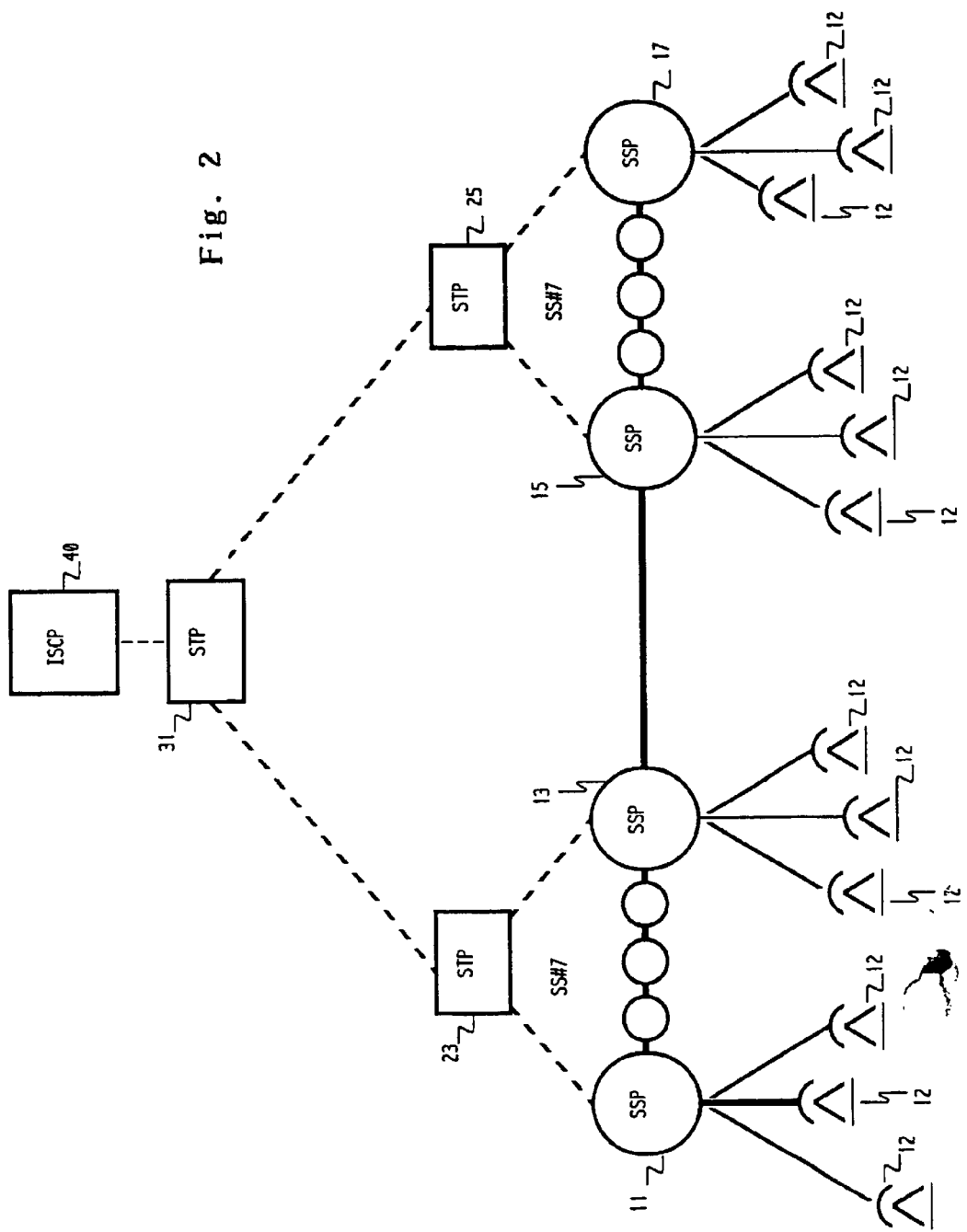
FIG. 2 is a simplified block diagram of a Public Switched Telephone Network (PSTN) that comprises a Common Channel Interoffice Signaling (CCIS) system and voice communication network that perform as an Advanced Intelligent Network (AIN) system.

FIG. 2 is a depiction of the AIN architectural environment that is considerably simplified for explanation purposes. The full network and operating environment for the invention may comprise multiple central offices, diverse interconnections, and provisions for reliability through redundancy, all of which need not be shown for developing an understanding of the invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. As well known, the SSPs recognize AIN type calls, launch queries to the ISCP and receive commands and data from the ISCP to further process the AIN calls. In the illustrated embodiment, the CO-SSPs are end offices.

SSP capable central office switching systems typically contain a programmable digital switch with CCIS communications capabilities. One example of an SSP capable CO switch is a 5ESS type switch manufactured by AT&T. Other vendors, such as Northern Telecom and Seimens, manufacture comparable digital switches that may serve as the SSPs. A more detailed description of an exemplary SSP type CO is presented in the commonly assigned copending application Ser. No. 08/248,980, filed May 25, 1994, hereby incorporated by reference herein.

The SSP type COs 11 and 13 are shown connected to a first local area STP 23, SSP-COs 15 and 17 being connected to a second local area STP 25. The connections to the STPs are for signalling purposes. The control part of SS7 protocol is known as Integrated Services Digital Network User Part (ISUP). ISUP determines the procedures for setting up, coordinating, and taking down trunk calls on the SS7 network.

Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSPs or not, may function primarily as tandem type offices providing connections between trunk circuits only.

The links between the central office switching systems and the local area STPs 23 and 25 are typically SS#7 type CCIS interoffice data communication channels. The local area STPs are in turn connected to each other and to the regional STP 31 via a packet switched network. The regional STP 31 also communicates with the ISCP 40 via a packet switched network.

The messages transmitted between the SSPs and the ISCP are formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node. Reference is made to the aforementioned copending application Ser. No. 08/248,980, filed May 25, 1994, for a more detailed description of the AIN network.

The ISCP 40 is an integrated system shown that contains a data base. In the AIN network system, certain calls receive specialized AIN type processing under control of data files stored in the ISCP data base. Such files contain call processing records (CPRs) associated with respective AIN subscribers. Information contained in the CPRs relate to the AIN service or services to which the customer subscribes. The SSP type local offices of the public telephone network include appropriate data in their translation tables for customers subscribing to AIN services to define certain call processing events identified as AIN "triggers". The SSP uses the translation table data to detect a triggering event during processing of calls to or from such AIN service subscribers. Upon detection of such event, the SSP suspends processing of a call and activates a query and response type AIN interaction with the ISCP. Completion of call processing ensues after sufficient information is exchanged between the SSP and the ISCP. For ordinary telephone service calls that are not subject to enhanced treatment, there would be no event to trigger AIN messaging. The local and toll office switches would function normally and process such calls without referring to the SCP data base for instructions.

Figure 3:
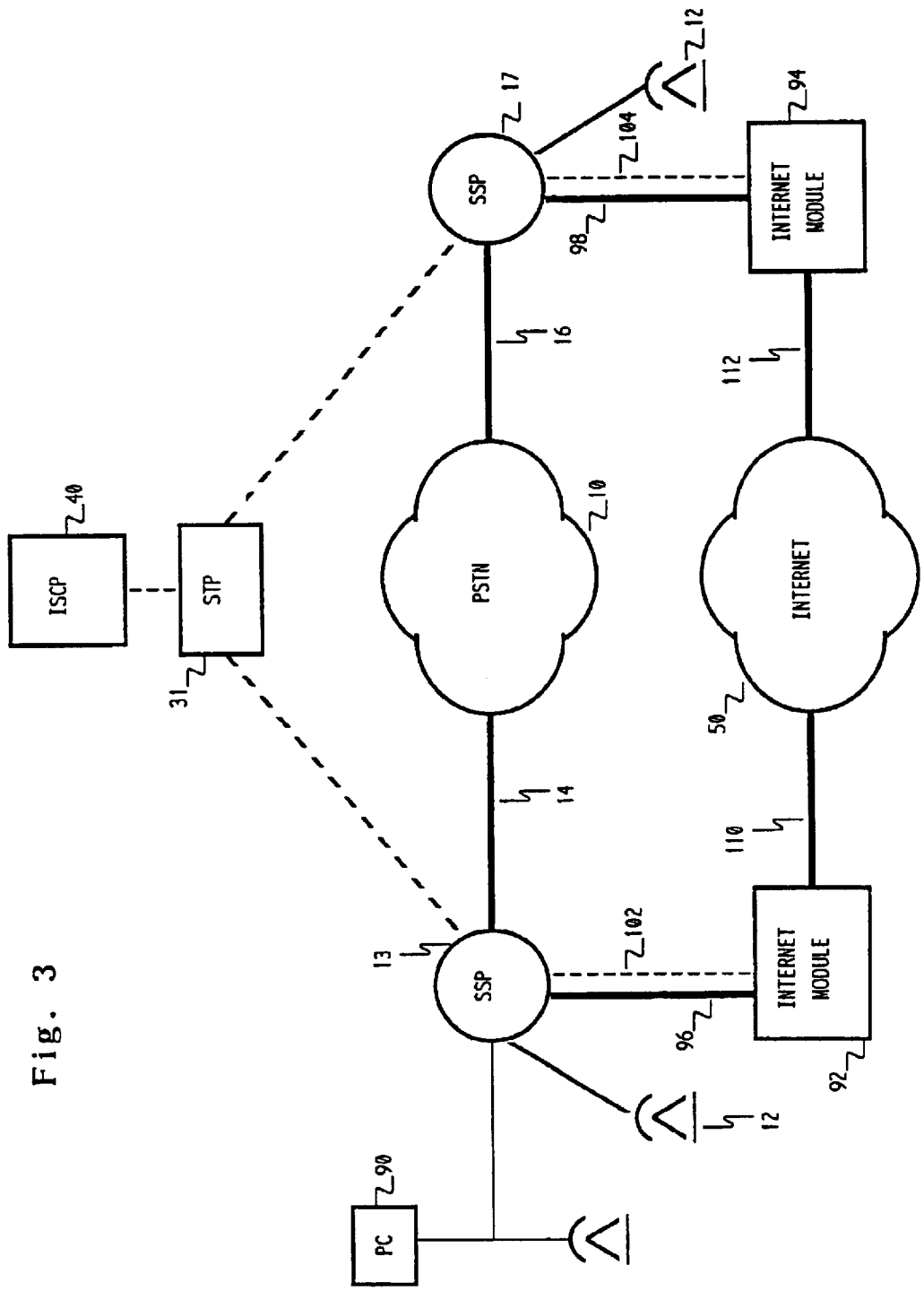
FIG. 3 is a simplified block diagram of an AIN controlled PSTN, such as the type shown in FIG. 2, which includes architecture for implementing Internet routing in accordance with one preferred embodiment of the invention.

FIG. 3 is a simplified block diagram of an AIN controlled PSTN, such as the type shown in FIG. 2, which includes architecture for implementing Internet routing in accordance with one preferred embodiment of the invention. It is to be understood that the Internet representation in this figure, as well as throughout this disclosure, is illustrative of any packet network of routers that allows voice traffic to be packetized and sent over a shared network. The use of the phrases "Internet" and "data packet network" or the like are used interchangeably throughout this description. In FIG. 3, wherein like reference numerals are used for corresponding elements of all other figures, there are shown two SSP capable central offices 13 and 17 which may be located in the same or different states and regions. These central offices are connected by trunks 14 and 16 respectively to the PSTN indicated by a cloud 10. Each central office is connected by local loops to subscribers customer premises equipment (CPE) such as telephone terminals 12 and PC 90. The telephone 12 may be a standard telephone used for Plain Old Telephone Service (POTS), with conversion of analog voice to digital signals performed at a central office, or a so-called "Internet Phone" that outputs digital voice signals. The SSPs 13 and 17 are connected by CCIS links to STP 31 which in turn may be connected to ISCP 40. While the STP functionality is here shown as constituting a single STP it will be appreciated that this is for the purpose of simplicity only and that a hierarchy of STPs may be involved.

Each of the central office SSPs 13 and 17 is connected to Internet Module 92 and 94, respectively, by T1 trunks 96 and 98. Alternatively, the Internet Module hardware may be situated at the central office and associated with the switching system. The Internet Module will be described in further detail with respect to FIG. 4. The Internet Modules may be provided with SSP capabilities and connected into the CCIS network directly to an STP or, as illustrated by the links 102 and 104, to the SSPs 13 and 17. The Internet Modules may be linked together for signaling purposes by conventional F links. The Internet Modules are connected to the Internet cloud by T1/T3 trunks 110 and 112.

Figure 1:
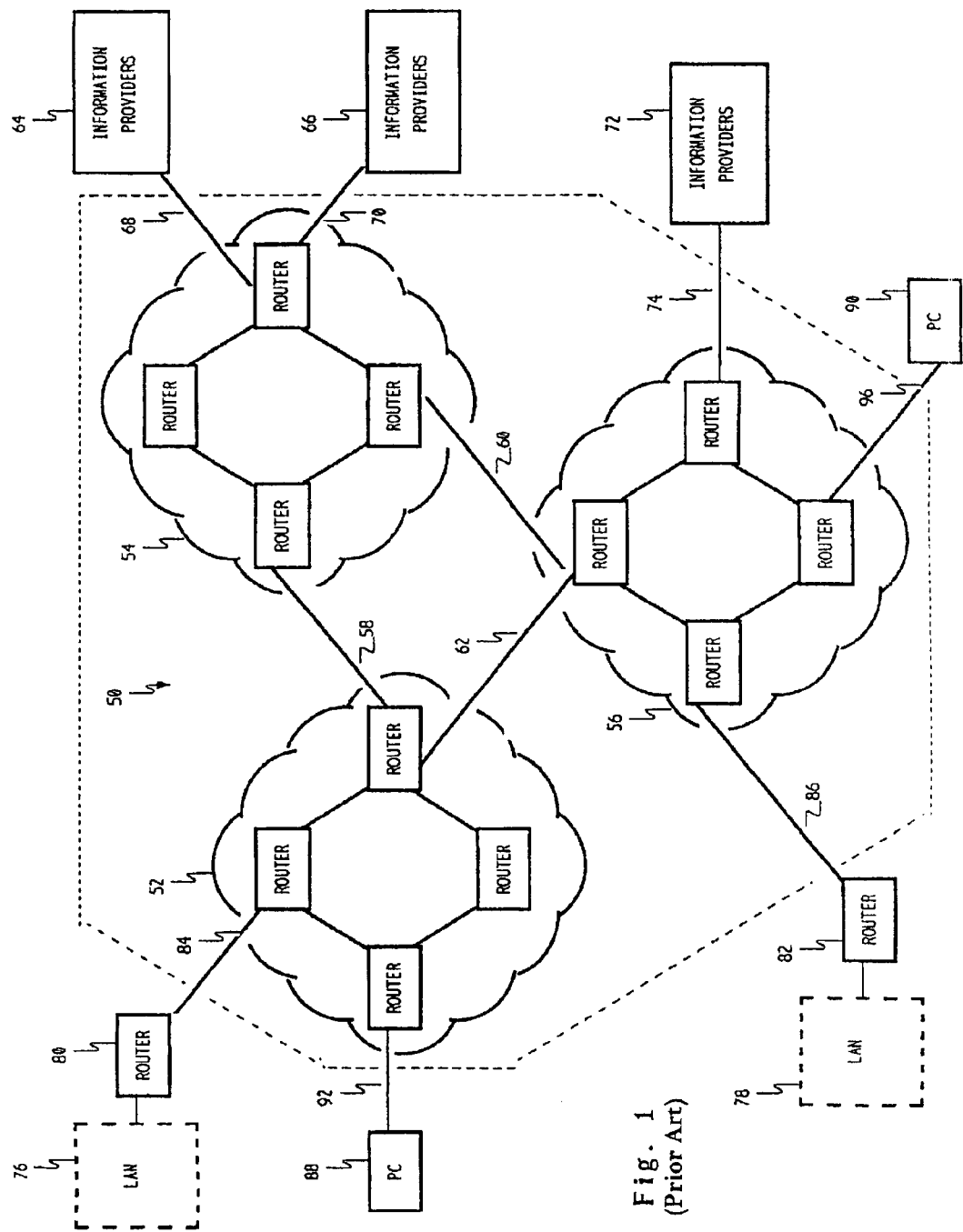
FIG. 1 is a simplified diagram of the Internet.
Figure 4:
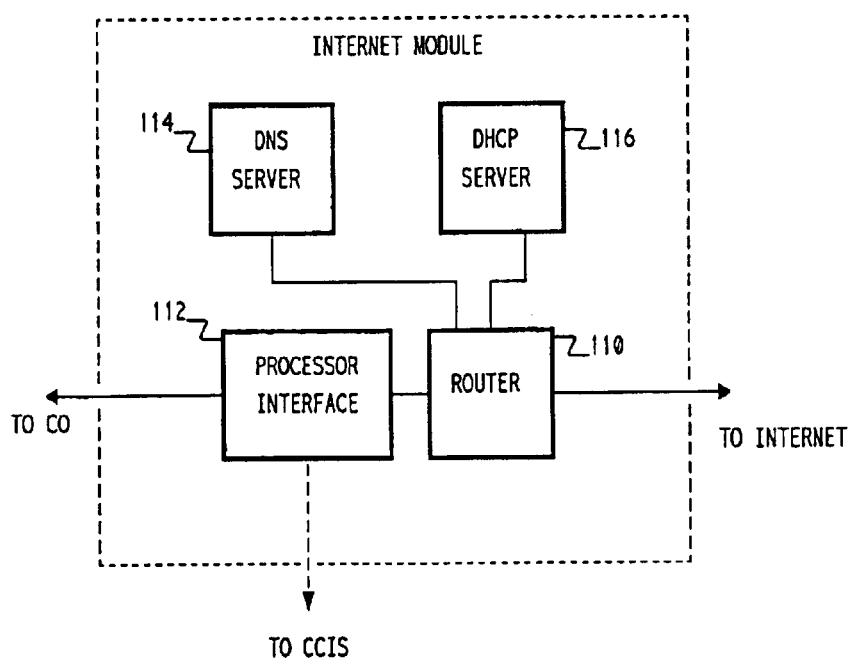
FIG. 4 is a diagram of the functional architecture of one embodiment of an Internet Module for use in the system and method of the invention.

The functional architecture of one embodiment of an Internet Module for use in the invention is diagrammatically in FIG. 4. The Internet Module includes a router 110 of the type now generally used in Internet practice, such as shown in FIG. 1 and described in related U.S. Pat. No. 5,790,548 issued on Aug. 4, 1998, referenced above. An interface with processing capability is illustratively shown at 112. Connected to the router are a Domain Name Service (DNS) server 114 and a Dynamic Host Configuration Protocol (DHCP) server 116 of the type conventionally used by Internet Service Providers in existing Internet Service. The router interface is connected to the central office and to the CCIS network while the router is connected to the Internet.

Figure 5:
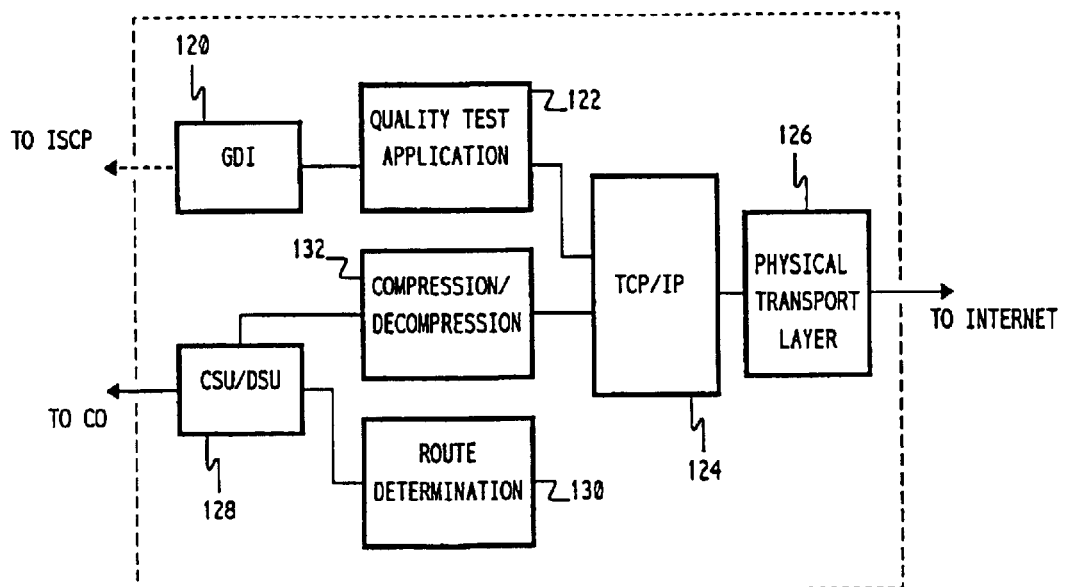
FIG. 5 is a block diagram that represents the functionality of the processor interface 112 and the router 110 shown in FIG. 4.

FIG. 5 is a block diagram that represents the functionality of the processor interface 112 and the router 110. The processor contains a common Generic Data Interface (GDI) 120 for communicating signaling messages with the ISCP in the telephone network. Upon prompt from the ISCP, through the GDI, a quality test application in the processor can be initiated for determining whether a call is to be routed through the Internet. Data communication by the gateway router of both signaling and information content through the Internet (or other equivalent packet network) occurs through TCP/IP protocol 124, packets being transmitted and received through physical transport layer 126. The physical transport layer may comprise Asynchronous Transfer Mode (ATM), frame relay or some other type of data communication mode.

While message and signaling communication with the ISCP occurs through the GDI, communication of voice data is made through the Channel Serving Unit, Digital Serving Unit (CSU/DSU) 128. This unit, which may physically comprise a digital line card in the processor with standard 24 digital voice line inputs, packetizes voice data received from the telephone central office. The CSU/DSU performs line coding, line-conditioning and equalization functions, and responds to loopback commands from the central office. Including functions similar to a modem, the CSU/DSU can pass data at a range greater than 56 Kbps. The CSU/DSU coordinates with route determination unit 130 to identify packets, termination phone numbers and routes to the network termination gateway router. The route determination information is included in each packet for the data received from the originating central office SSP. The packetized data is compressed in accordance with stored algorithm 132, before being sent to the TCP/IP stack and physical transport layer for transmission to the far end gateway router. To complete transmission to the destination telephone, the termination router decompresses the received packets, depacketizes back to voice data which is then routed to the destination PSTN. Two way capability for each of the functions is provided for communication in both directions. While shown for illustrative purposes as separate blocks, the route determination and compression/decompression functions, as well as the quality test application, may be run, for example, by a UNIX-based computer.

Figure 6A:
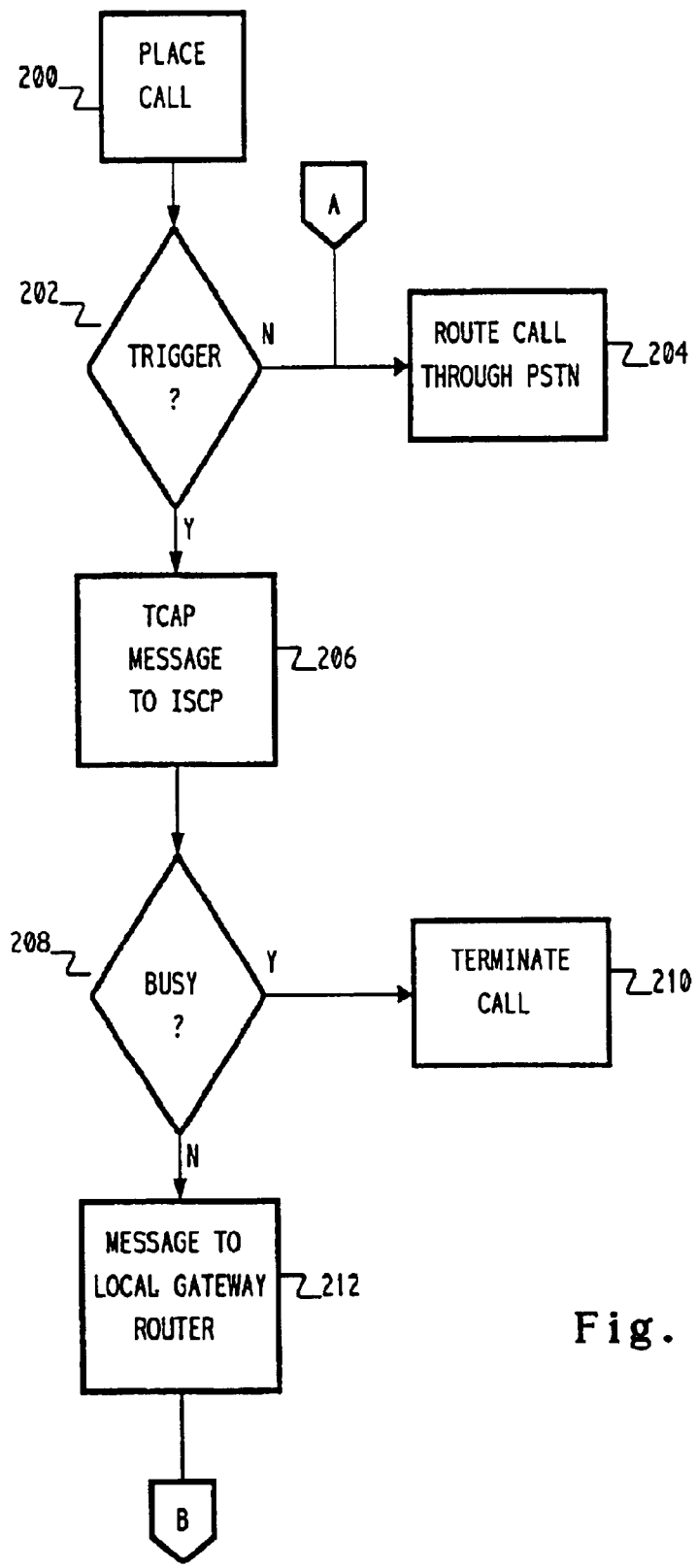
FIGS. 6A and 6B taken together form a simplified flow chart that illustrates operation of preferred embodiments of the invention in which service is provided on a per call basis.
Figure 6B:
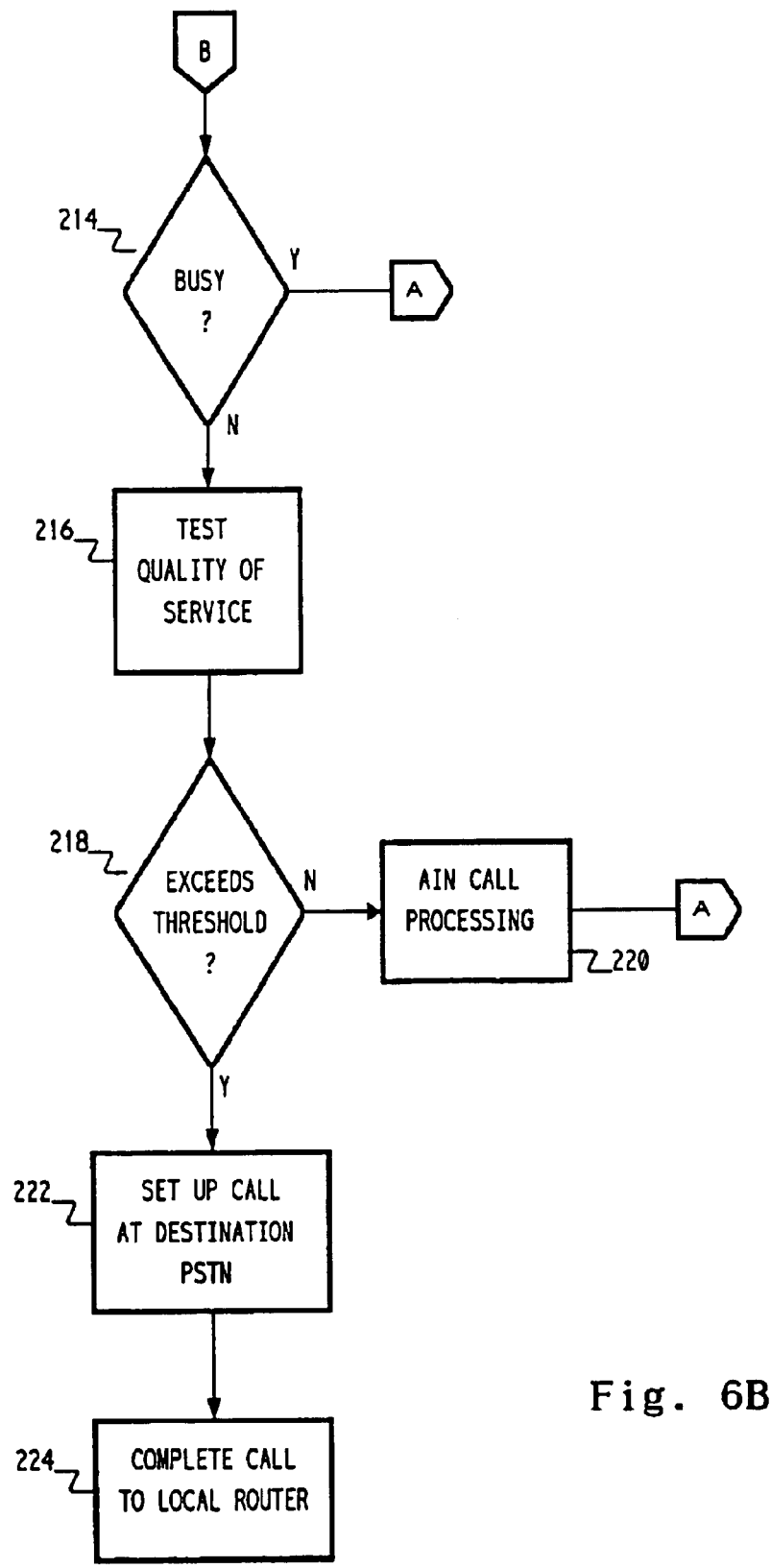

FIGS. 6A and 6B taken together form a simplified flow chart illustrating operation of a preferred embodiment of the invention. At step 200 a call is placed by a subscriber. The service is envisioned as affording flexibility through which a caller may be given the Internet option on either a per call basis or a predefined basis. In the predefined basis embodiment, the subscriber's CPR in the ISCP will contain preselected conditions for which routing through the Internet will occur, subject to acceptable quality of service in the network at the time of a call. Such preselected conditions can include any combination of time of day, day of week, destination areas, or specific destination telephone numbers. Of course, the CPR may be set to attempt Internet routing for all interlata calls if so desired.

In the per call basis embodiment, illustrated by FIG. 6A, the Internet routing attempt is made only for calls in which a preestablished prefix service code is entered by the caller. Such code may be, for example, *82 that is entered by DTMF before the dialed telephone number. Of course, other arrangements can be provided for a caller to seek Internet routing on a per call basis, for example, by placing a call to a specified virtual telephone number or through an operator.

At step 202 a determination is made at the caller's central office SSP whether to trigger a TCAP message to the AIN ISCP, whereupon processing of routing for the call is temporarily suspended. Triggering will occur in response to entry of the service code. This may be followed immediately by the dialed telephone number or a dial tone may be returned to the caller after the trigger for subsequent entry of the dialed telephone number. Alternatively, triggering can be initiated by calling a virtual number or an operator, after which the destination telephone number is input.

If a trigger has not been detected at step 202, the call is routed in normal fashion through the PSTN network at step 204. If a trigger has been detected, the originating central office SSP formulates a TCAP query message to the ISCP at step 206. The ISCP will recognize from the caller's CPR that the call is to be placed through the Internet (or equivalent data network) if the quality of service in that network meets an acceptable threshold level identified in the CPR of the calling party.

Before proceeding further, the ISCP determines through the SS7 signaling network, at step 208, whether the call destination station is busy. If so, the call is terminated with a busy signal transmitted to the calling party at step 210. As an alternative to the SS7 network determination, busy/non-busy status at the destination station can be determined through the Internet. In this alterative, the ISCP can signal the GDI interface of the local router to route through to the destination router interface to the destination PSTN for the inquiry.

If the destination station is not busy, the ISCP will send a message to the local gateway router to perform a quality of service test at step 212. If the local gateway GDI interface is unable to accept the message or the CSU/DSU unit of the router is fully occupied, as determined at step 214, the ISCP will instruct the originating SSP to complete the call through the PSTN at step 204. If the local gateway router is available, as determined at step 214, the GDI initiates the quality test application at step 216.

The performance of the quality of service test may comprise the sending of one or more data packets, known in the art as a "PING" signal, from the local router to the destination router and measuring the response time. PING, which is an acronym for Packet InterNet Groper, is a program used to test reachability of destinations by sending them an Internet Control Message Protocol (ICMP) echo packet request and waiting for a reply. The test packet signal generated by the quality test application is formatted for transport through physical layer 126 and the Internet to the destination end gateway router. As a more sophisticated alternative, the test application can format a sample packet with RSVP protocol that includes a bandwidth reservation for all routers that will transmit the call through the network. A measure of PING performance quality is the time delay taken for the signal to traverse the circuit, and variance of such delays in successive test transmissions. In the case of bandwidth reservation, an acknowledgement back from the destination that a specified minimum bandwidth level has been reserved is a measure of performance quality.

From the response back from the destination router, the test application obtains a quality of service level that is signaled back to the ISCP. This level is compared with an acceptable threshold level stored in the caller's CPR at step 218. If the level is not up to the acceptable level of quality, routing of the call is controlled by the AIN, which will terminate any data network activity for the call at step 220 and handle call routing as in step 204.

If it is determined at step 218 that the quality of service in the data network is acceptable, the ISCP will signal the local router, at step 220, to transmit a message to the destination router to initiate a call through the destination PSTN to the destination station. The path for transmission of the voice data through the data network will have been determined by the CSU/DSU unit 128, in conjunction with route destination unit 130, either when bandwidth had been reserved or, in the case of acceptable PING test result, in response to the ISCP signal received in step 218. The ISCP, at step 222, will send a TCAP message to the originating central office SSP to complete the call to the local router CSU/DSU port allocated for the call. Outgoing voice signals received by the CSU/DSU from the originating location will be compressed by unit 132, formatted using TCP/IP protocol and physically transported over the data packet network. Incoming packeted voice signals will be decompressed for transmission through the local PSTN to the origination location.

FIG. 7 is a partial simplified flow diagram for the preferred embodiment of the invention in which service is provided on a predefined basis. This figure illustrates only steps in which the call processing flow varies from the operation flow of the embodiment of FIGS. 6A and 6B. Thereafter, the embodiment proceeds to step 208 of FIG. 6A. That is, for this embodiment the steps 200 through 204 are replaced with the steps shown in FIG. 7. Placement of a call by a subscriber at step 300 initiates an off-hook trigger at the associated central office, step 302. The central office, in turn, suspends processing of call routing to formulate a TCAP message, transmitted to the ISCP at step 304. At step 306, the ISCP determines whether the information received in the TCAP message matches a predefined condition stored in the CPR of the calling subscriber. As indicated above, the CPR may contain a list of destination telephone numbers, area codes, times of day or week, or any combination of such criteria by which an attempt to rout a call through the Internet is to be attempted. Other criteria such as considered desirable by a subscriber can also be included.

If no predefined condition stored in the CPR has been recognized to identify the call as an Internet call in step 306, the call will be routed in normal fashion through the PSTN at step 308. If an Internet routing attempt is indicated at step 306, the process continues in accordance with FIGS. 6A and 6B at step 208 and the steps thereafter.

It can be appreciated that the use of the AIN network to control routing of telephone calls alternatively through the PSTN or Internet in accordance with this invention will ensure quality of voice communication while taking advantage of available network economies. While the per call basis and predefined basis services have been described above as separate embodiments for simplicity of explanation, these services can be combined into a single service. A subscriber thus can be given the option for any given call to expand the predefined conditions stored in the subscriber CPR, destinations and time of day listings for examples, by inputting a code, such as *82. The ISCP would be triggered in response to such input and programmed to ignore certain stored conditions in the CPR for the current call, while controlling routing in compliance with indicated acceptable quality levels.

Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein. For example, ISCP determination of whether routing may be made through the data network may be made in response to triggering initiated at an SSP other than the calling party originating SSP. The SSP 13 of FIG. 3 instead may be an intermediate SSP at the point of presence (POP) of an interexchange carrier that is linked to the originating caller SSP. The selection field in the SS7 ISUP message received by the SSP at the POP would indicate that routing through Internet is preferred if the quality of service in that network is acceptable. The use of the intelligent network to route the call to completion at that point is then under control of the interexchange carrier. As a further alternative, a dedicated trunk can be connected to the interexchange carrier SSP for all such calls.

We claim:

1. A method for providing voice communication between stations at two remote locations that are each linked to public switched telephone networks (PSTNs) comprising the steps of:

in response to placement of a voice telephone call to a PSTN by a first one of said stations, determining quality of service of a public data packet network;

comparing the quality of service obtained in said determining step with a predetermined threshold level for said voice telephone call;

in response to a result in said comparing step that said predetermined threshold level is exceeded, routing said voice telephone cal to a second one of said stations through said public data packet network in packet data format; and if said on determined threshold level is not exceeded, automatically routing said voice telephone cal in a manner that is undetectable to a caller to said second station through an interexchange carrier switched voice network in PSTN network protocol, wherein the PSTN of the calling station is an advanced intelligent network (AIN) that includes an integrated services control point (ISCP) having stored therein subscriber call processing records (CPRs).

2. A method as recited in claim 1, wherein placement of said telephone call comprises the step of entering a unique service code.

3. A method as recited in claim 1, wherein said interexchange carrier identity is specified in the subscriber CPR of the calling station.

4. A method as recited in claim 1, wherein said step of routing comprises exchanging signaling messages between the public switched telephone networks and said data packet network through interfaces.

5. A method as recited in claim 4, wherein said data packet network is the Internet.

6. A method as recited in claim 4, wherein said interfaces are gateway routers and said routing step comprises:
   determining that the destination station is not busy; and
   establishing a circuit in said data packet network between a gateway router connected to the PSTN of the calling station and a router connected to the PSTN of the destination station.

7. A method as recited in claim 1, wherein the CPR further comprises an applied operating criteria defined by a preselected condition that permits routing of said voice telephone call to occur when an acceptable quality of service is available.

8. A method as recited in claim 7, wherein the applied operating criteria is a time of day.

9. A method as recited in claim 7, wherein the applied operating criteria is a day of a week.

10. A method as recited in claim 7, wherein the applied operating criteria is a destination area.

11. A method as recited in claim 7, wherein the applied operating criteria is destination telephone number.

12. A method as recited in claim 1, wherein the CPR includes an acceptable level of service with a threshold quality level.

13. A method for providing voice communication between stations at two remote locations that are each linked to public switched telephone networks (PSTNs) comprising the steps of:
   in response to placement of a voice telephone call by a first one of said stations, determining quality of service of a public data packet network;
   comparing the quality of service obtained in said determining step with a predetermined threshold level for said voice telephone call;
   in response to a result in said comparing step that said predetermined threshold level is exceeded, routing said telephone call to a second one of said stations through said public data packet network in packet data format; and
   routing said voice telephone call to said second station through an interexchange carrier switched voice network in PSTN network protocol if said predetermined threshold level is not exceeded, wherein the PSTN of the calling station is an advanced intelligent network (AIN) that includes an integrated services control point (ISCP) having stored therein subscriber call processing records (CPRs), and said comparing step comprises retrieving a stored threshold value from the subscriber CPR of the calling station.

14. A method as recited in claim 13, wherein said determining step comprises triggering said ISCP in response to input of a unique service code at the calling station.

15. A method as recited in claim 13, wherein said determining step comprises triggering said ISCP in response to an off hook condition at the calling station.

16. A method as recited in claim 15, wherein said determining step fibber comprises the step of ascertaining if dialed information received from the calling station corresponds to information stored in the subscriber CPR for the calling station; and
   said comparing step occurs in response to a correspondence result in said ascertaining step.

17. A method as recited in claim 16, wherein said dialed information is area code.

18. A method as recited in claim 16, wherein said dialed information is destination telephone number.

19. A method as recited in claim 13, wherein said determining step comprises:
   transmitting at least one data packet through said data packet network;
   receiving at least one response packet; and
   measuring the round trip time duration therebetween.

20. A method as recited in claim 19, wherein said threshold level is exceeded if the time duration measured in said measuring step is less than a stored value in the calling station CPR.

21. A method as recited in claim 13, wherein said determining step comprises:
   transmitting a plurality of data packages through said data packet network;
   receiving a response packet for each data packet transmitted in said transmitting step;
   successively measuring the round trip time duration between each data packet transmitted in said transmitting step and receipt of its corresponding response packet; and
   ascertaining variance among said round trip time durations obtained in said measuring step.

22. A method as recited in claim 21, wherein said threshold level is exceeded if said variance in said ascertaining step is less than a stored value in the calling station CPR.

23. A method as recited in claim 13, wherein said determining step comprises transmitting at least one sample packet to said data packet network that requests reservation of a minimum bandwidth level to be dedicated among intermediary data packet network elements.

24. A method as recited in claim 23, wherein said threshold level is a predetermined bandwidth level below which a call is routed through the PSTN network.

25. A communications network comprising:
   a switched telecommunications network having interconnected central office switching systems and having subscriber lines connected to said central office switching systems providing connection between terminals connected to said subscriber lines, each of said central office switching systems responding to a service request on a subscriber line connected thereto to selectively provide a communication connection between the requesting line and another selected subscriber line through the connected central office switching system or through the connected central office switching system and at least one other central office switching system;
   a separate control network for said switched telecommunications network comprising a common channel interoffice signaling network including signal transfer points connected to said central office switching systems through signal switching points via links between said signal switching points and signal transfer points;
   a data network separate from said switched telephone network comprising multiple remotely spaced routers for linking together paths of said data network using transmission control protocols to provide connectionless packet service between remote locations of said data network;

at least two of said central office switching system having connected thereto an interface to said data network, said central office switching systems providing selective connection between said interfaces and the subscriber lines connected to each of said central office switching systems;

wherein each interface includes capability to invoke a quality test application for determining the quality of service in said data network; and wherein said control network comprises means responsive to the quality of service in the data network for selectively routing a voice call originating from a first central office switching system to a second central office switching system destination through said data network only if said quality of service exceeds a predetermined threshold level.

26. A communication network as recited in claim 25, wherein said data network is the Internet.

27. A communication network as recited in claim 26, wherein said interface is an Internet module that further comprises:

a processor having router and packet assembler and disassembler capabilities; and means for compressing and decompressing voice data.

* * * * *